United States Patent
Nakamura et al.

(10) Patent No.: US 12,013,349 B2
(45) Date of Patent: Jun. 18, 2024

(54) INSPECTION APPARATUS AND INSPECTION METHOD

(71) Applicant: HAMAMATSU PHOTONICS K.K., Hamamatsu (JP)

(72) Inventors: Tomonori Nakamura, Hamamatsu (JP); Kenichiro Ikemura, Hamamatsu (JP)

(73) Assignee: HAMAMATSU PHOTONICS K.K., Hamamatsu (JP)

(*) Notice: Subject to any disclaimer, the term of this patent is extended or adjusted under 35 U.S.C. 154(b) by 157 days.

(21) Appl. No.: 17/772,282

(22) PCT Filed: Oct. 27, 2020

(86) PCT No.: PCT/JP2020/040255
§ 371 (c)(1),
(2) Date: Apr. 27, 2022

(87) PCT Pub. No.: WO2021/145048
PCT Pub. Date: Jul. 22, 2021

(65) Prior Publication Data
US 2022/0373480 A1    Nov. 24, 2022

(30) Foreign Application Priority Data
Jan. 17, 2020  (JP) ................. 2020-005830

(51) Int. Cl.
G01N 21/956 (2006.01)
G01B 11/27 (2006.01)
G01N 21/64 (2006.01)

(52) U.S. Cl.
CPC ......... *G01N 21/956* (2013.01); *G01B 11/272* (2013.01); *G01N 21/64* (2013.01); *G01N 2021/95638* (2013.01)

(58) Field of Classification Search
CPC ................. G01N 21/956; G01N 21/64; G01N 2021/646; G01N 2201/103; G01B 11/272
See application file for complete search history.

(56) References Cited

U.S. PATENT DOCUMENTS 6,693,286 B2 * 2/2004 Hasegawa .......... G01N 21/6408
250/459.1
8,112,146 B2 * 2/2012 Hart .................... G16H 30/20
600/407

(Continued)

FOREIGN PATENT DOCUMENTS

CN    107110782 A    8/2017
JP    H08-316577 A   11/1996

(Continued)

OTHER PUBLICATIONS

English-language translation of International Preliminary Report on Patentability (IPRP) dated Jul. 28, 2022 that issued in WO Patent Application No. PCT/JP2020/040255.

*Primary Examiner* — Hung V Nguyen
(74) *Attorney, Agent, or Firm* — Faegre Drinker Biddle & Reath LLP (57) ABSTRACT

An inspection apparatus includes a light source unit, cameras, a keyboard, and a controller that determines a wavelength of the excitation light, based on the information on the emission color received by the keyboard, and that controls the light source unit so that the light source unit generates excitation light with the determined wavelength. The controller determines a wavelength longer than an absorption edge wavelength of the substrate of the sample and shorter than a peak wavelength of an emission spectrum of the light-emitting element, the peak wavelength being specified from the information on the emission color, to be the wavelength of the excitation light.

9 Claims, 3 Drawing Sheets

(56) References Cited

U.S. PATENT DOCUMENTS

| | | | |
|---|---|---|---|
| 9,885,657 B2* | 2/2018 | Rothberg | C12Q 1/6874 |
| 11,215,613 B2* | 1/2022 | Nagae | G01N 21/553 |
| 2013/0027543 A1 | 1/2013 | Boeykens et al. | |
| 2016/0197044 A1 | 7/2016 | Haefner et al. | |

FOREIGN PATENT DOCUMENTS

| | | |
|---|---|---|
| JP | 2003-240638 A | 8/2003 |
| JP | 2007-088389 A | 4/2007 |
| JP | 2014-157131 A | 8/2014 |
| JP | 2014-520272 A | 8/2014 |
| JP | 2015-010834 A | 1/2015 |
| JP | 2015-087171 A | 5/2015 |
| JP | 2018-132308 A | 8/2018 |
| TW | 201137323 A | 11/2011 |
| WO | WO-2012/176106 A2 | 12/2012 |

* cited by examiner

INSPECTION APPARATUS AND INSPECTION METHOD

TECHNICAL FIELD

An aspect of the present invention relates to an inspection apparatus and an inspection method.

BACKGROUND ART

As a method of determining whether a group of light-emitting elements formed on a substrate are non-defective or defective, probing has been known, according to which emitted light (electroluminescence) caused by putting a probe on a light-emitting element to create a current flow is measured. However, in the case of minute light-emitting elements, such as µLEDs, formed on a wafer, for example, probing of putting a probe on each of plurality of light-emitting elements to make measurement is difficult to perform because of physical restrictions. Among other methods, for example, a method is known, by which excitation light is emitted on a light-emitting element and photoluminescence emitted from the light-emitting element is observed to determine whether the light-emitting element is non-defective or defective (see, for example, Patent Literature 1). According to this method, whether a minute light-emitting element, such as the above-mentioned µLED, is non-defective or defective can be determined efficiently.

CITATION LIST

Patent Literature

Patent Literature 1: Japanese Unexamined Patent Publication No. 2018-132308

SUMMARY OF INVENTION

Technical Problem

The method of making a determination on being non-defective or defective by observing electroluminescence requires that emitted light from the light-emitting element, which is a measurement subject, be obtained (observed) properly to determine whether the light-emitting element is non-defective or defective highly precisely.

An aspect of the present invention has been conceived in view of the above circumstances, and it is therefore an object of the invention to determine whether a light-emitting element is non-defective or defective highly precisely.

Solution to Problem

An inspection apparatus according to one aspect of the present invention is an inspection apparatus that inspects an object including a substrate bearing a plurality of light-emitting elements. The inspection apparatus includes: a light source unit configured to generate excitation light emitted on a light-emitting element; a light detection unit configured to detect emitted light from the light-emitting element exposed to the excitation light; an input unit configured to receive information on an emission color of the light-emitting element; and a control unit configured to determine a wavelength of the excitation light, based on the information on the emission color received by the input unit, the control unit controlling the light source unit so that the light source unit generates excitation light with the determined wavelength. The control unit determines a wavelength longer than an absorption edge wavelength of the substrate of the object and shorter than a peak wavelength of an emission spectrum of the light-emitting element, the peak wavelength being specified from the information on the emission color, to be the wavelength of the excitation light.

In the inspection apparatus according to the one aspect of the present invention, input of the information on the emission color of the light-emitting element is received, and the wavelength of the excitation light is determined to be a wavelength shorter than the peak wavelength of the emission spectrum of the light-emitting element. In this manner, by determining the wavelength of the excitation light according to the emission color of the light-emitting element and determining the wavelength of the excitation light to be shorter than the peak wavelength of the emission spectrum of the light-emitting element, emitted light from the light-emitting element can be detected properly. In the inspection apparatus according to the one aspect of the present invention, the wavelength of the excitation light is determined to be a wavelength longer than the absorption edge wavelength of the substrate of the object. This prevents a case where the substrate absorbs light to make it difficult for the excitation light from reaching the light-emitting element, and a case where the excitation light excites the substrate, thus preventing a case where light different from emitted light from the light-emitting element is detected. As described above, according to the inspection apparatus of the one aspect of the present invention, emitted light from the light-emitting element, which is a measurement subject, is obtained properly and whether the light-emitting element is non-defective or defective can be determined highly precisely, based on the emitted light.

The control unit may determine a wavelength shorter than a wavelength given by subtracting the full width half maximum of the emission spectrum of the light-emitting element from the peak wavelength of the emission spectrum of the same, to be the wavelength of the excitation light. This makes the wavelength of the excitation light shorter than most of wavelength bands included in the emission spectrum, thus allowing proper detection of emitted light from the light-emitting element.

The light source unit may include a white light source of the excitation light and a plurality of first band-pass filters that transmit beams of excitation light with different wavelength bands from each other, and the control unit may switch the first band-pass filter according to the determined wavelength of the excitation light. In this manner, the wavelength of the excitation light is changed by switching the band-pass filter. This makes providing a plurality of light sources for wavelength change unnecessary, thus allowing miniaturization of the apparatus.

The light source unit may include a plurality of light sources that generate beams of excitation light with different wavelengths from each other, and the control unit may switch the plurality of light sources according to the determined wavelength of the excitation light. According to such a configuration, the wavelength of the excitation light can be changed in a simple apparatus structure not provided with a plurality of band-pass filters.

The inspection apparatus may further include a plurality of second band-pass filters that transmit beams of emitted light with different wavelength bands, and the control unit may switch the second band-pass filter disposed in an optical path leading from the light-emitting element to the light detection unit, according to the determined wavelength of the excitation light. In this configuration, a proper second band-pass filter can be set in connection with determination of the wavelength of the excitation light according to the emission color of the light-emitting element. Hence a band-pass filter suitable for detecting emitted light can be set smoothly.

The inspection apparatus may further include a plurality of first wavelength separation elements that define wavelengths different from each other as first separation wavelengths, respectively, and that separate the excitation light from emitted light by using the first separation wavelength as separation reference, and the control unit may switch the first wavelength separation element disposed in an optical path leading from the light source unit to the light-emitting element and in an optical path leading from the light-emitting element to the light detection unit, according to the determined wavelength of the excitation light. In this configuration, a proper first wavelength separation element can be set in connection with determination of the wavelength of the excitation light according to the emission color of the light-emitting element. Hence a wavelength separation element suitable for detecting emitted light can be set smoothly.

The inspection apparatus may further include a plurality of second wavelength separation elements that define wavelengths different from each other as second separation wavelengths, respectively, and that separate emitted light with a wavelength longer than the second separation wavelength from emitted light with a wavelength shorter than the second separation wavelength by using the second separation wavelength as separation reference. The light detection unit may include a first photodetector that from among beams of emitted light, detects emitted light with a wavelength longer than the second separation wavelength, and a second photodetector that from among beams of emitted light, detects emitted light with a wavelength shorter than the second separation wavelength. The control unit may switch the second wavelength separation element disposed in an optical path leading from the light-emitting element to the first photodetector and the second photodetector, according to the determined wavelength of the excitation light. In this configuration, a proper second wavelength separation element can be set in connection with determination of the wavelength of the excitation light according to the emission color of the light-emitting element. Hence, in a configuration in which emitted light on a longer wavelength side and emitted light on a shorter wavelength side are detected by two photodetectors, a wavelength separation element suitable for detecting emitted light can be set smoothly.

The inspection apparatus may further include a plurality of second band-pass filters that transmit beams of light with different wavelength bands, a plurality of first wavelength separation elements that define wavelengths different from each other as first separation wavelengths, respectively, and that separate the excitation light from emitted light by using the first separation wavelength as separation reference, and a plurality of second wavelength separation elements that define wavelengths different from each other as second separation wavelengths, respectively, and that separate emitted light with a wavelength longer than the second separation wavelength from emitted light with a wavelength shorter than the second separation wavelength by using the second separation wavelength as separation reference. The light source unit may include a white light source of the excitation light, and a plurality of first band-pass filters that transmit beams of excitation light with different wavelength bands. The light detection unit may include a first photodetector that from among beams of emitted light, detects emitted light with a wavelength longer than the second separation wavelength, and a second photodetector that from among beams of emitted light, detects emitted light with a wavelength shorter than the second separation wavelength. The control unit may switch the first band-pass filter, the second band-pass filter, the first wavelength separation element, and the second wavelength separation element in an integral manner, according to the determined wavelength of the excitation light. In this configuration, components suitable for smoother detection of emitted light can be set in connection with determination of the wavelength of the excitation light according to the emission color of the light-emitting element.

An inspection method according to one aspect of the present invention is an inspection method for inspecting an object including a substrate bearing a plurality of light-emitting elements. The method includes the steps of: inputting information on an emission color of a light-emitting element; deriving an absorption edge wavelength of the substrate of the object and a peak wavelength of an emission spectrum of the light-emitting elements, based on the information on the emission color; and controlling the light source unit in such a way as to make a wavelength of excitation light longer than the absorption edge wavelength and shorter than the peak wavelength, the excitation light being emitted from the light source unit onto the light-emitting element.

Advantageous Effects of Invention

According to one aspect of the present invention, whether a light-emitting element is non-defective or defective can be determined highly accurately.

DESCRIPTION OF EMBODIMENT

Embodiment of the present invention will hereinafter be described in detail with reference to the drawings. In the drawings, the same components or components corresponding to each other are denoted by the same reference signs, and redundant description will be omitted.

Figure 1:
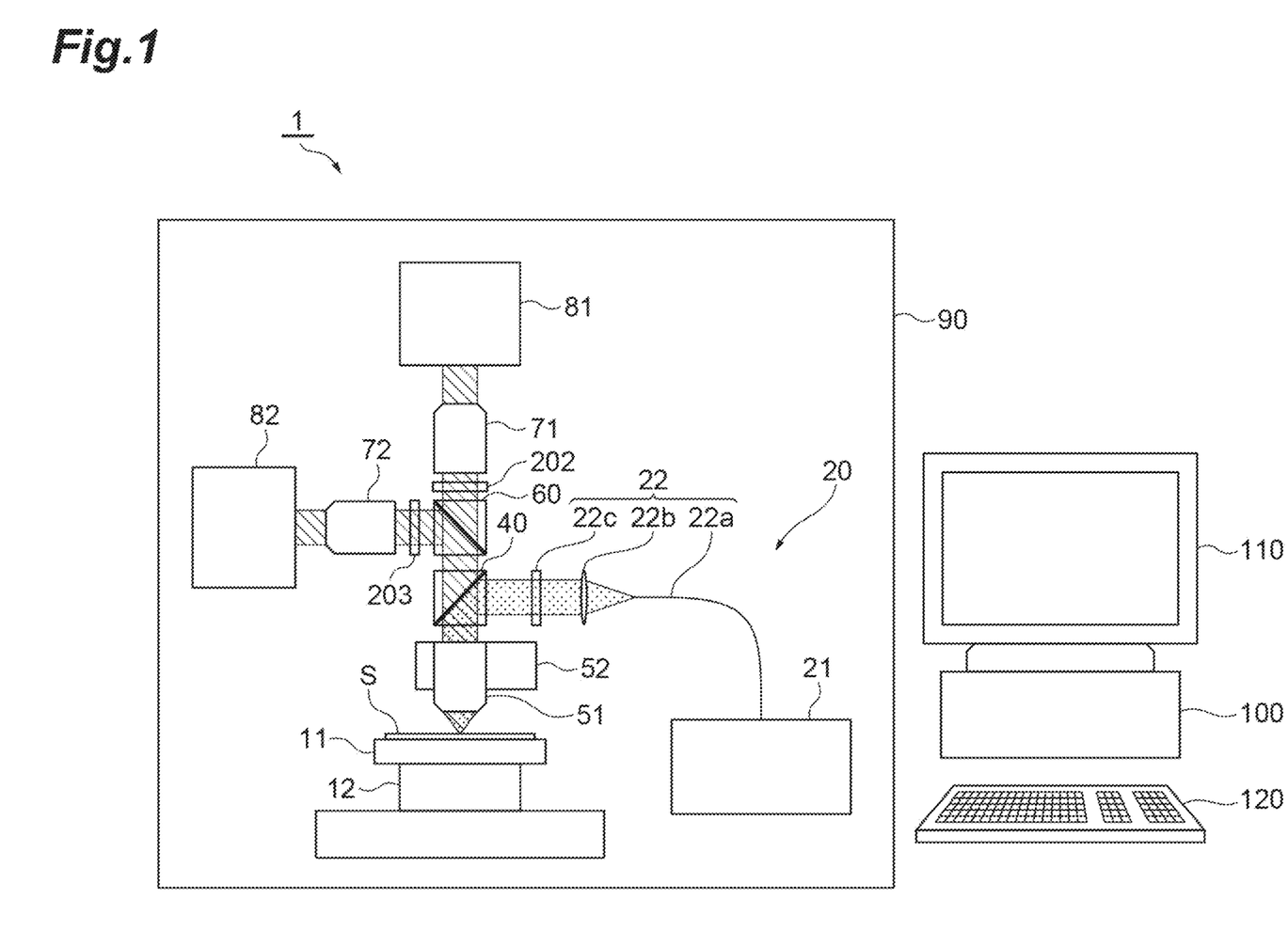
FIG. 1 is a configuration diagram of an inspection apparatus according to an embodiment of the present invention.

FIG. 1 is a configuration diagram of an inspection apparatus 1 according to an embodiment of the present invention. The inspection apparatus 1 is an apparatus that inspects a sample S (object). The sample S is, for example, a semiconductor apparatus including a substrate bearing a plurality of light-emitting elements formed thereon. The light-emitting elements are, for example, LEDs, mini LEDs, μLEDs, SLD elements, laser elements, vertical laser elements (VC-SEL), or the like. In this embodiment, the substrate of the sample S includes not only a layer made of silicon, sapphire, or the like but also a layer made of GaN or the like that is formed on the above layer by epitaxial growth. The inspection apparatus 1 determines whether each of the light-emitting elements formed on the sample S is non-defective or defective by observing photoluminescence (specifically, fluorescence or the like) emitted from each light-emitting element. Whether the light-emitting element is non-defective or defective may be determined by, for example, probing (that is, determined based on the electrical characteristics). However, in the case of a minute LED, such as a μLED, probing of putting a probe on the LED to make a measurement is difficult because of physical restrictions. In contrast, a method of determining whether the light-emitting element is non-defective or defective, based on photoluminescence, the method being according to this embodiment, allows making a determination on being non-defective or defective through obtaining a photoluminescence image. According to the method, therefore, a large amount of light-emitting elements' being non-defective or defective can be determined efficiently without being hampered by physical restrictions.

As shown in FIG. 1, the inspection apparatus 1 includes a chuck 11, an XY stage 12, a light source unit 20, a plurality of wavelength separation elements 40 (first wavelength separation elements), an objective lens 51, a Z stage 52, a plurality of wavelength separation elements 60 (second wavelength separation elements), imaging lenses 71 and 72, a camera 81 (light detection unit or first photodetector) and a camera 82 (light detection unit or second photodetector), a dark box 90, a controller 100 (control unit), a monitor 110, a keyboard 120 (input unit), and a plurality of band-pass filters 202 and of band-pass filters 203 (second band-pass filters). The dark box 90 houses the above components except the controller 100, the monitor 110, and the keyboard 120, and is provided to protect each component housed in the dark box 90 from the effects of external light. Each component housed in the dark box 90 may be mounted on a vibration isolation table in order to improve the quality of images captured by the cameras 81 and 82 (improve the image quality and prevent a positional shift of the image).

The chuck 11 is a holding member that holds the sample S. The chuck 11 holds the sample S by, for example, vacuum-sucking the substrate of the sample S. The XY stage 12 is a stage that moves the chuck 11 holding the sample S in XY directions (front-to-back and left-to-right directions), that is, directions along the surface of the chuck 11 that bears the sample S. Following control by the controller 100, the XY stage 12 moves the chuck 11 in the XY directions in such a way as to place each of the plurality of light-emitting elements in an excitation light exposure area in order. The inspection apparatus 1 may further include a rotary stage (θ stage, which is not shown). Such a rotary stage may be disposed, for example, on the XY stage 12 and under the chuck 11, or may be set integrally with the XY stage 12. The rotary stage works for making precise vertical and horizontal alignment of the sample S. Providing the rotary stage reduces a time required for alignment and the like, thus reducing a total time required for data processing.

The light source unit 20 generates excitation light emitted on a light-emitting element. The light source unit 20 includes one excitation light source 21 and an optical system 22. The excitation light source 21 is a light source that generates excitation light to be emitted on the sample S and emits the excitation light on the sample S. The excitation light source 21 is, for example, a white light source capable of generating light including a wavelength that excites the light-emitting element of the sample S. The white light source is, for example, an LED, a laser, a halogen lamp, a mercury lamp, a D2 lamp, a plasma light source, or the like. The inspection apparatus 1 may further include a sensor that monitors illumination luminance in order to keep the luminance of excitation light emitted from the excitation light source 21 constant.

The optical system 22 includes an optical fiber cable 22a, a light-guide lens 22b, and a plurality of band-pass filters 22c (first band-pass filters). The optical fiber cable 22a is an optical fiber cable for light guide connected to the excitation light source 21. As the optical fiber cable 22a, for example, a polarization preserving fiber, a single mode fiber, or the like can be used. The light-guide lens 22b is, for example, a single or composite convex lens, and guides excitation light, which reaches the light-guide lens 22b via the optical fiber cable 22a, toward the wavelength separation elements 40.

The plurality of band-pass filters 22c are filters that transmit beams of excitation light with different wavelength bands. This means that the plurality of band-pass filters 22c have wavelength band ranges for filtering different from each other. Only one of the plurality of band-pass filters 22c is selected and set in band-pass filter switching by the controller 100, which will be described later. The band-pass filters 22c are provided between the light-guide lens 22b and the wavelength separation elements 40 for the purpose of preventing a time-dependent change in the wavelength of excitation light emitted from the excitation light source 21.

The plurality of wavelength separation elements 40 define wavelengths different from each other as first separation wavelengths, respectively, and separate excitation light from emitted light by using the first separation wavelength as separation reference. In other words, the plurality of wavelength separation elements 40 are different from each other in separation wavelengths serving as reference for separating excitation light from emitted light. Only one of the plurality of wavelength separation elements 40 is selected and set in wavelength separation element switching by the controller 100, which will be described later. Each wavelength separation element 40 is a dichroic mirror constructed by using optical materials, such as a dielectric multilayer film, and reflects light with a specific wavelength while transmitting light with other wavelengths. Specifically, the wavelength separation element 40 is configured to reflect excitation light toward the objective lens 51 and transmit photoluminescence (specifically, fluorescence or the like) from the light-emitting element, the photoluminescence being light different in wavelength from excitation light, toward the wavelength separation elements 60.

The objective lens 51 is a component for observing the sample S, and condenses excitation light guided by the wavelength separation element 40 on the sample S. The Z stage 52 carries out focus adjustment by moving the objective lens 51 in a Z direction (vertical direction), i.e., a direction intersecting the surface of the chuck 11 that bears the sample S.

The plurality of wavelength separation elements 60 define wavelengths different from each other as second separation wavelengths, respectively, and separate emitted light with a wavelength longer than the second separation wavelength from emitted light with a wavelength shorter than the second separation wavelength by using the second separation wavelength as separation reference. In other words, the plurality of wavelength separation elements 60 are different from each other in separation wavelengths serving as reference for separating emitted light on the longer wavelength side from emitted light on the shorter wavelength side. Only one of the plurality of wavelength separation elements 60 is selected and set in wavelength separation element switching by the controller 100, which will be described later Each wavelength separation element 60 is a dichroic mirror constructed by using optical materials, such as a dielectric multilayer film, and reflects light with a specific wavelength while transmitting light with other wavelengths. This dichroic mirror is provided not only as a mirror characterized by its sharp change in transmittance (reflectance) with respect to the wavelength but may also be provided as a mirror characterized by its gradual change in transmittance (reflectance) in a wavelength range of about 100 nm. Further, the dichroic mirror may also be a mirror characterized by its change in transmittance (reflectance) in a wavelength range of 400 nm to 900 nm or 400 nm to 700 nm. The wavelength separation element 60 is configured not to transmit (that is, to reflect) emitted light with a wavelength shorter than the second separation wavelength and to transmit fluorescence with a wavelength longer than the second separation wavelength. Emitted light with a shorter wavelength reflected by the wavelength separation element 60 is, for example, emitted light with a wavelength included in a normal emission spectrum (emitted light with an original emission wavelength), and fluorescence with a longer wavelength transmitted by the wavelength separation element 60 is emitted light with a wavelength not included in the normal emission spectrum (emitted light on the longer wavelength side). It should be noted that the original emission wavelength may be, for example, a wavelength known in advance from specifications of the light-emitting element, or may be a wavelength corresponding to a light intensity peak obtained by measuring fluorescence from the light-emitting element by a spectroscope. To be exactly, the wavelength separation element 60 transmits part of emitted light with a wavelength shorter than the second separation wavelength and reflects part of emitted light with a wavelength longer than the second separation wavelength. Generally speaking, however, the wavelength separation element 60 reflects emitted light with a wavelength shorter than the second separation wavelength and transmits emitted light with a wavelength longer than the second separation wavelength. The following description, therefore, will be made on the assumption that "the wavelength separation element 60 reflects emitted light with a wavelength shorter than the second separation wavelength and transmits emitted light with a wavelength longer than the second separation wavelength." Emitted light with a wavelength longer than the second separation wavelength (emitted light on the longer wavelength side) reaches the imaging lens 71 via the wavelength separation element 60. Emitted light with a wavelength shorter than the second separation wavelength (emitted light with the original emission wavelength) reaches the imaging lens 72 via the wavelength separation element 60. The wavelength separation element 60 is not necessarily a dichroic mirror, and may be constructed by, for example, combining a half mirror and the band-pass filter 202 or 203.

The plurality of band-pass filters 202 are filters that transmit beams of emitted light with different wavelength bands. In other words, the plurality of band-pass filters 202 are different from each other in wavelength bands for filtering. Only one of the plurality of band-pass filters 202 is selected and set in band-pass filter switching by the controller 100, which will be described later. To block unnecessary emitted light on the longer wavelength side, the band-pass filter 202 is disposed between the wavelength separation element 60 and the camera 81. The band-pass filter 202 may be composed of a short-pass filter. The plurality of band-pass filters 203 are filters that transmit beams of emitted light with different wavelength bands. In other words, the plurality of band-pass filters 203 are different from each other in wavelength bands for filtering. Only one of the plurality of band-pass filters 203 is selected and set in band-pass filter switching by the controller 100, which will be described later. To prevent mixing of emitted light on the longer wavelength side that is caused by surface reflection by the wavelength separation element 60 in measurement of emitted light on the shorter wavelength side, the band-pass filter 203 is disposed between the wavelength separation element 60 and the camera 82. The band-pass filter 203 may be composed of a long-pass filter.

The imaging lens 71 is a lens that focuses emitted light on the longer wavelength side and that guides the focused emitted light to the camera 81. The camera 81 is an image-capturing unit that creates an image from emitted light from the sample S. More specifically, the camera 81 captures and detects emitted light with a wavelength longer than the above second separation wavelength (emitted light on the longer wavelength side) among beams of emitted light from the light-emitting element. The camera 81 outputs an emission image of emitted light on the longer wavelength side, which is an imaging result, to the controller 100. The camera 81 is, for example, an area image sensor, such as a CCD or a MOS. The camera 81 may be compose of a line sensor or a time delay integration (TDI) sensor.

The imaging lens 72 is a lens that focuses emitted light with the original emission wavelength and that guides the focused emitted light to the camera 82. The camera 82 is an image-capturing unit that creates an image from emitted light from the sample S. More specifically, among beams of emitted light from the light-emitting element, the camera 82 captures and detects emitted light with a wavelength that is shorter than the above second separation wavelength and that is included in the normal emission spectrum ES of the light-emitting element (emitted light with the original emission wavelength). The camera 82 outputs an emission image of emitted light with the original emission wavelength, which is an imaging result, to the controller 100. The camera 82 is, for example, an area image sensor, such as a CCD or a MOS. The camera 82 may be composed of a line sensor or a time delay integration (TDI) sensor.

The controller 100 is a computer, and includes such physical elements as a RAM and a ROM, i.e., memories, a CPU, i.e., a processor (arithmetic circuit), a communication interface, and a hard disc, i.e., a storage unit. As the controller 100, for example, a personal computer, a cloud server, or a smart apparatus (smartphone, tablet terminal, etc.) is used. The controller 100, a computer system, exerts its functions when the CPU executes a program stored in the memory. The controller 100 controls the XY stage 12, the excitation light source 21, the Z stage 52, and the cameras 81 and 82. Specifically, the controller 100 controls the XY stage 12 to adjust an excitation light exposure area (exposure area on the sample S). The controller 100 controls the Z stage 52 to make focus adjustment related to excitation light. The controller 100 controls the excitation light source 21 to adjust emission of excitation light and adjust the wavelength, amplitude, and the like of excitation light as well. The controller 100 controls the cameras 81 and 82 to make adjustment related to acquisition of an emission image.

In addition, the controller 100 determines whether a light-emitting element of the sample S is non-defective or defective, based on emission images taken by the cameras 81 and 82. The controller 100 determines whether the light-emitting element is non-defective or defective, based on an emission image by light on the longer wavelength side, the image being taken by the camera 81, and on an emission image by light with the original emission wavelength, the image being taken by the camera 82. For example, the controller 100 determines whether the light-emitting element is non-defective or defective, based on the emission image by light with the original emission wavelength, the image being taken by the camera 82, and then further determines whether the light-emitting element having been determined to be non-defective by the above determination process is non-defective or defective, based on the emission image by light on the longer wavelength side, the image being taken by the camera 81.

First, the controller 100 identifies the position of the light-emitting element based on the emission image, thereby identifying an emission area of each light-emitting element. The position of the light-emitting element is identified by, for example, conversion of a position indicated in the emission image and the position of the XY stage 12. The controller 100 may acquire an overall pattern image of the sample S in advance and recognize (identify) the position of the light-emitting element from the pattern image and the emission image. Then, based on the emission image by light with the original emission wavelength, the controller 100 derives average luminance in the emission area of each light-emitting element, and associates an address position with luminance (average luminance in the emission area) for each light-emitting element. For each address (each light-emitting element), the controller 100 derives an evaluation index from absolute luminance and relative luminance. The relative luminance refers to a ratio of the luminance of a target light-emitting element, for which an evaluation index is to be derived, to the average luminance of a light-emitting element group including the target light-emitting element and light-emitting elements around the target light-emitting element. The controller 100 derives the evaluation index from, for example, the product of the absolute luminance and the relative luminance. Alternatively, controller 100 derives the evaluation index from the product of the absolute luminance and the n-th power of the relative luminance (n denotes a natural number, e.g., 2). The controller 100 carries out the above process of deriving the evaluation index on each light-emitting element included in the same emission image. The controller 100 acquires a new emission image (emission image by light with the original emission wavelength) by changing the exposure area, and derives an evaluation index for each light-emitting element included in the acquired emission image. When having derived evaluation indexes for all light-emitting elements, the controller 100 sorts (rearranges) the light-emitting elements in the order of higher evaluation indexes. This sorting gives a finding that the evaluation indexes start dropping sharply at a certain point (point of change). The controller 100, for example, may set such a point of change as a threshold and may determine a light-emitting element with an evaluation index equal to or higher than the threshold to be a non-defective (non-defective pixel) while determining a light-emitting element with an evaluation index smaller than the threshold to be a defective (defective pixel). The threshold may be determined in advance by, for example, comparing a result of determination on the light-emitting element's being non-defective or defective based on fluorescence (photoluminescence) with a result of determination on the light-emitting element's being non-defective or defective based on probing (result of determination on the light-emitting element's being non-defective or defective based on electrical characteristics), using a reference semiconductor apparatus for determining the threshold.

Based on the emission image by light on the longer wavelength side, the controller 100 detects luminescent spots (emission spots) in the emission area of each light-emitting element, and associates an address position with the number of luminescent spots for each light-emitting element. Such luminescent spots (emission spots) shifted further to the longer wavelength side relative to the normal emission spectrum are abnormal emission spots. For light-emitting elements having been determined to be non-defective by the above process of determination on being non-defective or defective based on the emission image by light with the original emission wavelength, the controller 100 determines whether a certain number or more of luminescent spots are included in the emission image by light on the longer wavelength side, and determines a light-emitting element of which the emission image by light on the longer wavelength side does not include a certain number or more of luminescent spots to be a non-defective (non-defective pixel) while determines a light-emitting element of which the emission image of the same includes a certain number or more of luminescent spots to be a defective (defective pixel). According to this process, even a light-emitting element having been determined to be a non-defective, based on the emission image by light with the original emission wavelength, may be determined to be a defective in some cases, based on the fluorescence image by light on the longer wavelength side.

After determining whether a light-emitting element is non-defective or defective, based on the emission image by light with the original emission wavelength, the emission image being taken by the camera 82, the controller 100 may further determine whether a light-emitting element having been determined to be defective by the above determination process is non-defective or defective, based on the emission image by light on the longer wavelength side, the emission image being taken by the camera 81. The controller 100 may carry out the determination on the light-emitting element's being non-defective or defective, the determination being based on the emission image by light on the longer wavelength side, on all the light-emitting elements. In this manner, the controller 100 may carry out the determination on the light-emitting element's being non-defective or defective, the determination being based on the emission image by light on the longer wavelength side, only on the light-emitting element having been determined to be non-defective, based on the emission image by light with the original emission wavelength, or only on the light-emitting element having been determined to be defective, based on the emission image by light with the original emission wavelength, or on all the light-emitting elements, regardless of the result of the determination on the light-emitting element's being non-defective or defective, the determination being based on the emission image by light with the original emission wavelength.

The controller 100 outputs a result of determination on each light-emitting element's being non-defective or defective. The result of determination on each light-emitting element's being non-defective or defective is displayed on, for example, the monitor 110. The controller 100 may identify a defective part (e.g., a luminescent spot on the longer wavelength side) in the light-emitting element and output the position of the defective part (to put the position on the monitor 110).

To make the above determination on the light-emitting element's being non-defective or defective highly precisely, the controller 100 carries out given control according to information on the emission color of the light-emitting element. The information on the emission color of the light-emitting element is entered by, for example, the user's typing on the keyboard 120 and is inputted to the controller 100.

Based on the information on the emission color entered by typing on the keyboard 120, the controller 100 determines the wavelength of excitation light. Specifically, the controller 100 determines a wavelength longer than the absorption edge wavelength of the substrate of the sample S and shorter than the peak wavelength of the emission spectrum of the light-emitting element, the peak wavelength being specified from the information on the emission color, to be the wavelength of excitation light. The absorption edge wavelength of the substrate is the longest wavelength at which light absorption occurs on the substrate. The absorption edge wavelength of the substrate is determined by the bandgap of a base material. Light with a wavelength longer than the absorption edge wavelength of the substrate passes through the substrate. As described above, the substrate of the sample S includes not only the layer made of silicon, sapphire, or the like but also the layer made of GaN or the like that is formed on the above layer by epitaxial growth. Making the wavelength of excitation light longer than the absorption edge wavelength of the substrate prevents a case where the substrate is excited by excitation light (light emission occurs on the substrate). In addition, by determining the wavelength of excitation light to be shorter than the peak wavelength of the emission spectrum, the light-emitting element can be excited properly to obtain emitted light from the light-emitting element. More specifically, the controller 100 determines a wavelength shorter than a wavelength given by subtracting the full width half maximum of the emission spectrum from the peak wavelength of the emission spectrum of the light-emitting element (a wavelength given as a difference created by subtracting the full width half maximum), to be the wavelength of the excitation light.

Figure 2:
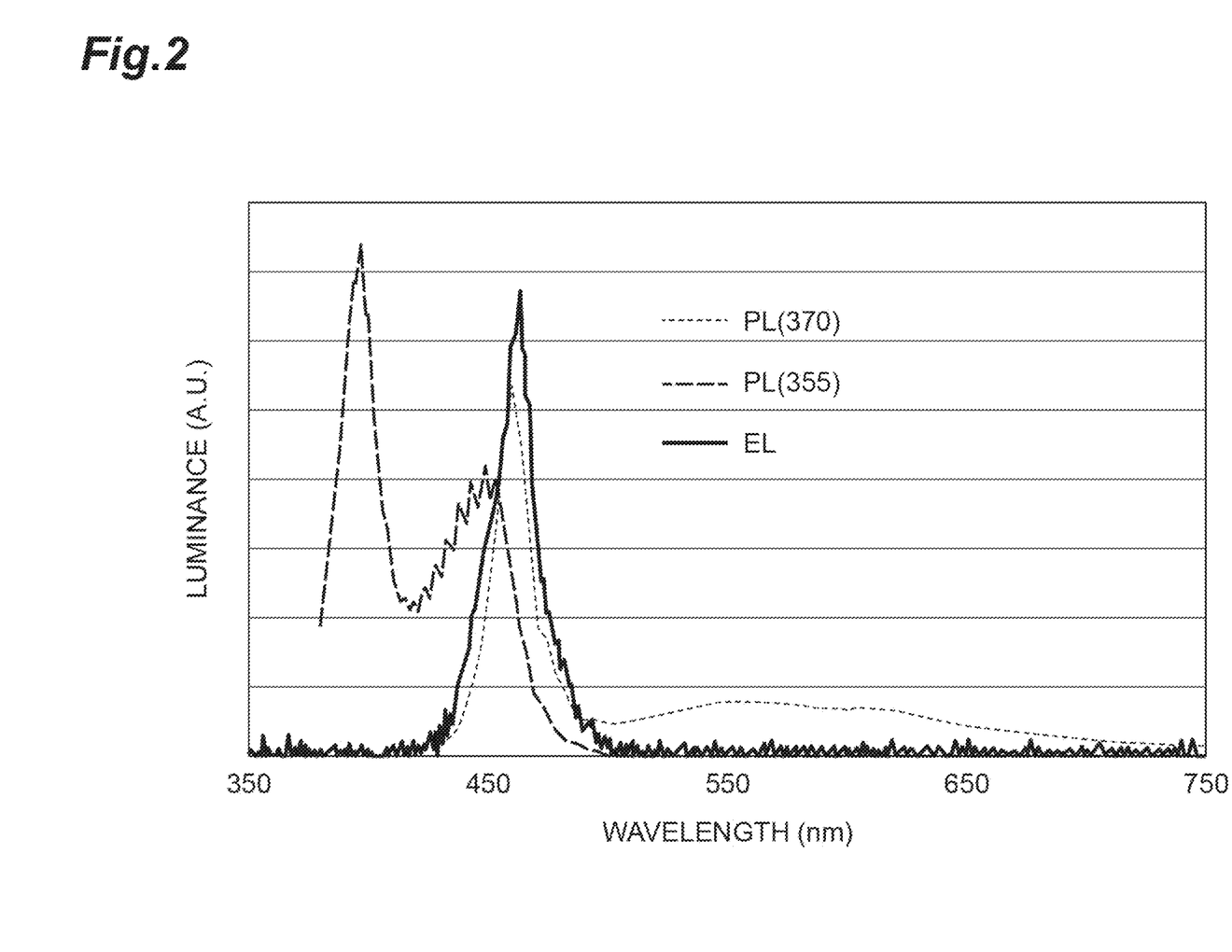
FIG. 2 is a diagram for explaining emission spectra.

FIG. 2 is a diagram for explaining emission spectra that result under different conditions. In FIG. 2, the horizontal axis represents wavelength and the vertical axis represents luminance (A.U.). In FIG. 2, a thin broken line indicates the emission spectrum of the sample S that results when the wavelength of excitation light is set 370 nm, a thick broken line indicates the emission spectrum of the sample S that results when the wavelength of excitation light is set 355 nm, and a continuous line indicates the emission spectrum of the sample S that results when the sample S carries a current flow. In a situation where the sample S as a product is used for a practical purpose, each light-emitting element carries a current flow. When excitation light is emitted on the light-emitting element to determine whether the light-emitting element is non-defective or defective, therefore, the emission spectrum of the light-emitting element may be approximate to the emission spectrum that results when the light-emitting element carries a current flow. It should be noted that the case of exiting the light-emitting element by excitation light and the case of supplying the light-emitting element with a current flow are actually different from each other in the level of luminance of emitted light. However, because what is important here is the shape of the emission spectrum, FIG. 2 shows emission spectra whose differences in the luminance level are properly adjusted.

Now it is assumed that the light-emitting element of the sample S to be observed is a blue LED (i.e., an LED whose emission color is blue). In this case, the emission wavelength of the light-emitting element ranges, for example, from 420 nm to 480 nm. It is also assumed that the absorption edge wavelength of the Gan substrate of sample S is 365 nm. Under such conditions, when the wavelength of excitation light is set 355 nm, that is, when the wavelength of excitation light is determined to shorter than the absorption edge wavelength of the substrate, the emission spectrum ("PL (355)" shown in FIG. 2) turns out to be widely different from the emission spectrum that results when the light-emitting element carries a current flow ("EL" shown in FIG. 2), as shown in FIG. 2. This happens because as a result of the wavelength of excitation light being made shorter than the absorption edge wavelength of the substrate, the emission spectrum was affected by emitted light from the substrate. When the wavelength of excitation light is set 370 nm, that is, when the wavelength of excitation light is determined to longer than the absorption edge wavelength of the substrate, on the other hand, the emission spectrum ("PL (370)" shown in FIG. 2) turns out to be approximate to the emission spectrum that results when the light-emitting element carries a current flow ("EL" shown in FIG. 2), as shown in FIG. 2. In this manner, by making the wavelength of excitation light longer than the absorption edge wavelength of the substrate of the sample S, a proper emission spectrum can be obtained, the emission spectrum being not affected by emitted light from the substrate. In the above example, the wavelength of excitation light may be determined to be within a range of 365 nm to 420 nm, which is a range between a short wavelength edge of the emission spectrum and the absorption edge wavelength of the substrate. It should be noted that the wavelength of excitation light should preferably be as long as possible within the above range, in which case an intermediate region of a quantum well is not excited and consequently the contrast of light emission intensity increases. When the light-emitting element is, for example, a green LED (whose emission color is green), the emission wavelength of the light-emitting element ranges, for example, from 490 nm to 550 nm. In this case, the wavelength of excitation light may be determined to be within a range of 365 nm to 490 nm, which is a range of the absorption edge wavelength of the substrate.

The controller 100 controls the light source unit 20 so that the light source unit 20 generates excitation light with the determined wavelength. Specifically, the controller 100 selects the band-pass filter 22c, which transmits excitation light with the determined wavelength, and disposes the band-pass filter 22c on the optical path leading from the light source unit 20 to the wavelength separation element 40 so that excitation light with the determined wavelength is emitted from the light source unit 20 onto the light-emitting element. In this manner, the controller 100 switches the band-pass filter 22c according to the determined wavelength of excitation light. It should be noted that the inspection apparatus 1 may include a plurality of excitation light sources 21 that generate beams of excitation light with different wavelengths. In this case, the excitation light source 21 may be composed of a plurality of light sources capable of generating beams of monochromatic light different in wavelength from each other, and these plurality of light sources are, for example, LEDs, SLDs, lasers, or the like. In this case, the controller 100 selects an excitation light source 21 capable of generating excitation light with the determined wavelength and causes the selected excitation light source 21 to generates the excitation light. By this process, the controller 100 can generate excitation light with the intended wavelength in the same manner as in the case of switching the band-pass filter 22c to set a proper band-pass filter 22c. In this manner, the controller 100 may switch the plurality of excitation light sources 21 according to the determined wavelength of excitation light.

The controller 100 may switch the band-pass filter 202 disposed on the optical path leading from the light-emitting element to the camera 81, according to the determined wavelength of excitation light. In this case, for example, by taking into consideration the emission color of the light-emitting element, the emission color being involved in the process of determining the wavelength of excitation light, the controller 100 selects a band-pass filter 202 capable of blocking a leak of excitation light from the wavelength separation element 60 and unnecessary emitted light on the longer wavelength side. The controller 100 may switch also the band-pass filter 203 disposed on the optical path leading from the light-emitting element to the camera 82, according to the determined wavelength of excitation light. In this case, for example, by taking into consideration the emission color of the light-emitting element, the emission color being involved in the process of determining the wavelength of excitation light, the controller 100 selects a band-pass filter 203 capable of blocking a leak of excitation light from the wavelength separation element 60 and preventing mixing of emitted light on the longer wavelength side into measurement of emitted light on the shorter wavelength side.

The controller 100 may switch the wavelength separation element 40 disposed on the optical path leading from the light source unit 20 to the light-emitting element and the optical path leading from the light-emitting element to the cameras 81 and 82, according to the determined wavelength of excitation light. In this case, for example, by taking into consideration the emission color of the light-emitting element and the wavelength of excitation light, the controller 100 selects a wavelength separation element 40 capable of reflecting excitation light toward the objective lens 51 and transmitting emitted light to allow it to proceed toward the wavelength separation element 60.

The controller 100 may switch the wavelength separation element 60 disposed on the optical path leading from the light-emitting element to the cameras 81 and 82, according to the determined wavelength of excitation light. In this case, for example, by taking into consideration the emission color of the light-emitting element, the controller 100 selects a wavelength separation element 60 capable of properly separating emitted light with the original emission wavelength from emitted light on the longer wavelength side (separation element 60 using the second separation wavelength properly).

The controller 100 may switch the band-pass filter 22c, the band-pass filters 202 and 203, the wavelength separation element 40, and the wavelength separation element 60 in an integral manner, according to the determined wavelength of excitation light. In other words, in conjunction with determination of the wavelength of excitation light, the controller 100 may simultaneously switch the above band-pass filter 22c, band-pass filters 202 and 203, wavelength separation element 40, and wavelength separation element 60.

Figure 3:
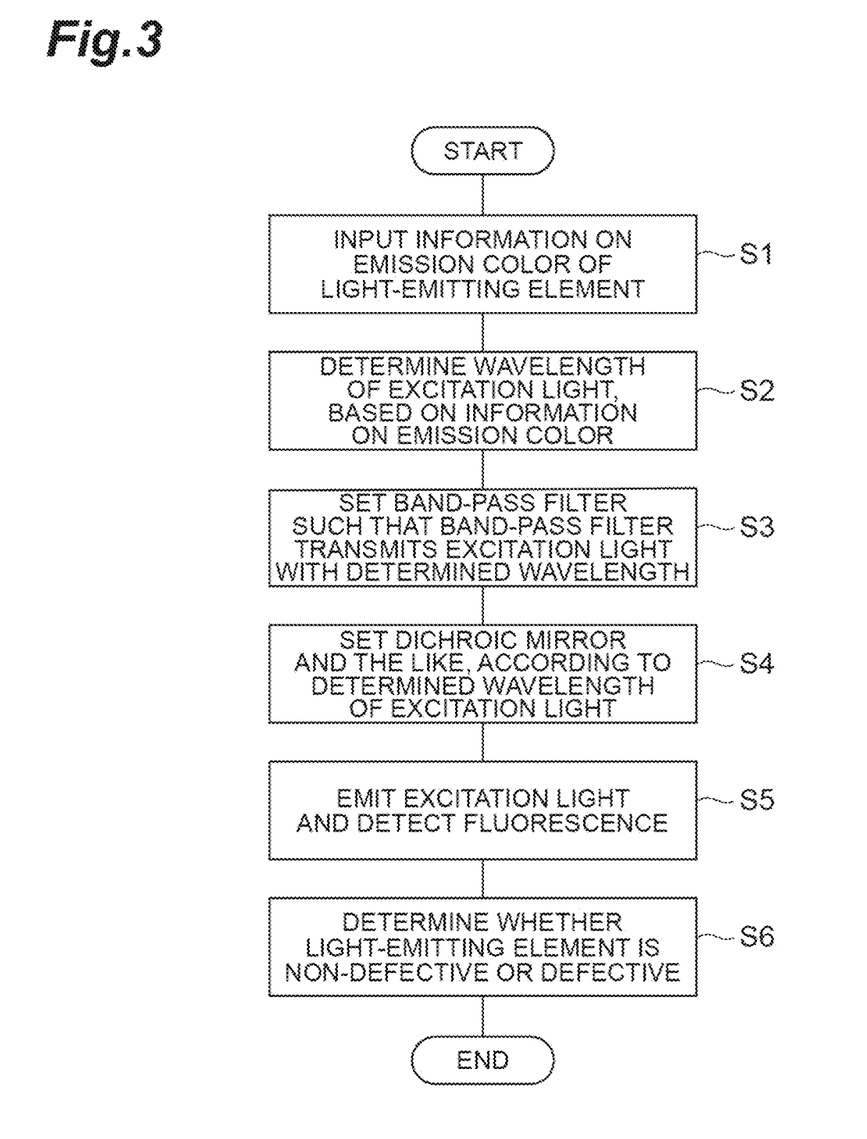
FIG. 3 is a flowchart of an inspection method.

An inspection method will then be described with reference to FIG. 3. FIG. 3 is a flowchart of the inspection method that is carried out using the inspection apparatus 1. The inspection method is a method of inspecting the sample S including the substrate bearing the plurality of light-emitting elements formed thereon.

First, information on the emission color of the light-emitting element is inputted by typing on the keyboard 120, as shown in FIG. 3 (step S1: input step). The inspection apparatus 1 receives an input of the information on the emission color.

Subsequently, the inspection apparatus 1 determines the wavelength of excitation light, based on the information on the emission color (step S2). Specifically, based on the information on the emission color, the inspection apparatus 1 derives the absorption edge wavelength of the substrate of the sample S and the peak wavelength of the emission spectrum of the light-emitting element (deriving step).

Subsequently, the inspection apparatus 1 sets the band-pass filter 22c of the light source unit 20 such that the band-pass filter 22c passes excitation light with the determined wavelength (step S3). In other words, the inspection apparatus 1 controls the light source unit 20 such that the wavelength of excitation light is longer than the absorption edge wavelength of the substrate and is shorter than the peak wavelength of the emission spectrum (control step).

Subsequently, the inspection apparatus 1 sets the band-pass filter 22c, the band-pass filters 202 and 203, the wavelength separation elements 40, and the wavelength separation elements 60 in an integral manner, according to the determined wavelength of excitation light (step S4).

Subsequently, the inspection apparatus 1 emits excitation light into the light-emitting element and detects emitted light (fluorescence) from the light-emitting element (step S5). The inspection apparatus 1 then determines whether the light-emitting element is non-defective or defective, based on emitted light from the light-emitting element (step S6).

Effects the inspection apparatus 1 according to this embodiment offers will then be described.

The inspection apparatus 1 is the inspection apparatus that inspects the sample S including the substrate bearing the plurality of light-emitting elements. The inspection apparatus includes: the light source unit 20 that generates excitation light emitted on a light-emitting element; the cameras 81 and 82 that detect emitted light from the light-emitting element exposed to the excitation light; the keyboard 120 that receives input of information on the emission color of the light-emitting element; and the controller 100 that determines the wavelength of the excitation light, based on the information on the emission color received by the keyboard 120, and that controls the light source unit 20 so that the light source unit 20 generates excitation light with the determined wavelength. The controller 100 determines a wavelength longer than the absorption edge wavelength of the substrate of the sample S and shorter than the peak wavelength of the emission spectrum of the light-emitting element, the peak wavelength being specified from the information on the emission color, to be the wavelength of the excitation light.

In this inspection apparatus 1, input of the information on the emission color of the light-emitting element is received, and the wavelength of the excitation light is determined to be a wavelength shorter than the peak wavelength of the emission spectrum of the light-emitting element. In this manner, by determining the wavelength of the excitation light according to the emission color of the light-emitting element and determining the wavelength of the excitation light to be shorter than the peak wavelength of the emission spectrum of the light-emitting element, emitted light from the light-emitting element can be detected properly. In the inspection apparatus according to one aspect of the present invention, the wavelength of the excitation light is determined to be a wavelength longer than the absorption edge wavelength of the substrate of the sample S. This prevents a case where the substrate absorbs light to make it difficult for the excitation light from reaching the light-emitting element. It also prevents a case where the excitation light excites the substrate, thus preventing a case where light different from emitted light from the light-emitting element is detected. As described above, according to the inspection apparatus 1, emitted light from the light-emitting element, which is a measurement subject, is obtained properly and whether the light-emitting element is non-defective or defective can be determined highly precisely, based on the emitted light.

The controller 100 may determine a wavelength shorter than a wavelength given by subtracting the full width half maximum of the emission spectrum from the peak wavelength of the emission spectrum of the light-emitting element, to be the wavelength of the excitation light. This makes the wavelength of the excitation light shorter than most of wavelength bands included in the emission spectrum, thus allowing proper detection of emitted light from the light-emitting element.

The light source unit 20 may include the white light source of the excitation light and a plurality of band-pass filters 22c that transmit beams of excitation light with different wavelength bands, and the controller 100 may switch the band-pass filter 22c according to the determined wavelength of the excitation light. In this manner, the wavelength of the excitation light is changed by switching the band-pass filter 22c. This makes providing a plurality of excitation light sources 21 for wavelength change unnecessary, thus allowing miniaturization of the inspection apparatus 1.

The light source unit 20 may include a plurality of excitation light sources 21 that generate beams of excitation light with different wavelengths, and the controller 100 may switch the plurality of excitation light sources 21 according to the determined wavelength of the excitation light. According to such a configuration, the wavelength of the excitation light can be changed in a simple apparatus structure not provided with a plurality of band-pass filters 22c.

The inspection apparatus 1 may further include a plurality of band-pass filters 202 and 203 that transmit beams of emitted light with different wavelength bands, and the controller 100 may switch the band-pass filter 202 disposed in the optical path leading from the light-emitting element to the camera 81 and the band-pass filter 203 disposed in the optical path leading from the light-emitting element to the camera 82, according to the determined wavelength of the excitation light. In this configuration, the proper band-pass filters 202 and 203 can be set in connection with determination of the wavelength of the excitation light according to the emission color of the light-emitting element. Hence the band-pass filters 202 and 203 suitable for detecting emitted light can be set smoothly.

The inspection apparatus 1 may further include the plurality of wavelength separation elements 40 that define wavelengths different from each other as the first separation wavelengths, respectively, and that separate the excitation light from emitted light by using the first separation wavelength as separation reference, and the controller 100 may switch the wavelength separation element 40 disposed in the optical path leading from the light source unit 20 to the light-emitting element and in the optical path leading from the light-emitting element to the cameras 81 and 82, according to the determined wavelength of the excitation light. In this configuration, the proper wavelength separation element 40 can be set in connection with determination of the wavelength of the excitation light according to the emission color of the light-emitting element. Hence the wavelength separation element 40 suitable for detecting emitted light can be set smoothly.

The inspection apparatus 1 may further include the plurality of wavelength separation elements 60 that define wavelengths different from each other as second separation wavelengths, respectively, and that separate emitted light with a wavelength longer than the second separation wavelength from emitted light with a wavelength shorter than the second separation wavelength by using the second separation wavelength as separation reference, and may include the camera 81 that from among beams of emitted light, detects emitted light with a wavelength longer than the second separation wavelength, and the camera 82 that from among beams of emitted light, detects emitted light with a wavelength shorter than the second separation wavelength. The controller 100 may switch the wavelength separation element 60 disposed in the optical path leading from the light-emitting element to the camera 81 and the camera 82, according to the determined wavelength of the excitation light. In this configuration, the proper wavelength separation element 60 can be set in connection with determination of the wavelength of the excitation light according to the emission color of the light-emitting element. Hence, in a configuration in which emitted light on the longer wavelength side and emitted light on the shorter wavelength side are detected by two photodetectors, the wavelength separation element 60 suitable for detecting emitted light can be set smoothly.

The controller 100 may switch the band-pass filter 22c, the band-pass filters 202 and 203, the wavelength separation element 40, and the wavelength separation element 60 in an integral manner, according to the determined wavelength of the excitation light. In this configuration, components suitable for smoother detection of emitted light can be set in connection with determination of the wavelength of the excitation light according to the emission color of the light-emitting element.

In the inspection apparatus 1, area sensors make up a light detection unit, the area sensors being a first photodetector provided as the camera 81 and a second photodetector provided as the camera 82. As these photodetectors, however, single point sensors may be used to make up the light detection unit. The single point sensor is provided as, for example, a photodiode, a PIN-photodiode, an avalanche photodiode, a photomultiplier tube, a photoresistor, or the like. The single point sensor has a light-receiving unit made of, for example, Si, GaAs, InP, GaP, InGaAs, or InSb. When the light detection unit configured in the above manner is provided, for example, emitted light may be detected from a specific point by moving the sample S by the XY stage 12, or may be detected by scanning as the sample S is moved by the XY stage 12. In another case, the inspection apparatus 1 is further equipped with an optical scanning unit having a galvanometer mirror or the like in an optical system, in which case emitted light from a specific point on the sample S may be detected or emitted light from the sample S may be detected by scanning. When the above-described scanning detection is carried out, for example, irregularities of the surface of the sample S can be observed based on a wavelength shift, or a Raman shift of the sample S can be observed dynamically.

REFERENCE SINGS LIST

1 Inspection apparatus
20 light source unit
21 excitation light source
22c band-pass filter
40 wavelength separation element
60 wavelength separation element
81, 82 camera
100 controller
120 keyboard
202, 203 band-pass filter

The invention claimed is:

1. An inspection apparatus inspecting an object comprising a substrate bearing a plurality of light-emitting elements, the inspection apparatus comprising:
   a light source detector configured to generate excitation light emitted on a light-emitting element;
   a light detector configured to detect emitted light from the light-emitting element exposed to the excitation light;

an input unit configured to receive information on an emission color of the light-emitting element; and a controller configured to determine a wavelength of the excitation light, based on the information on the emission color received by the input unit, the controller controlling the light source so that the light source generates the excitation light with the determined wavelength, wherein the controller determines a wavelength longer than an absorption edge wavelength of the substrate of the object and shorter than a peak wavelength of an emission spectrum of the light-emitting element, the peak wavelength being specified from the information on the emission color, to be the wavelength of the excitation light.

2. The inspection apparatus according to claim 1, wherein the controller determines a wavelength shorter than a wavelength given by subtracting a full width half maximum of an emission spectrum of the light-emitting element from a peak wavelength of the emission spectrum of the light-emitting element, to be a wavelength of the excitation light.

3. The inspection apparatus according to claim 1, wherein the light source comprises a white light source of the excitation light and a plurality of first band-pass filters configured to transmit beams of the excitation light with different wavelength bands, and the controller switches one of the first band-pass filters according to a determined wavelength of the excitation light.

4. The inspection apparatus according to claim 1, wherein the light source comprises a plurality of light sources configured to generate beams of the excitation light with different wavelengths, and the controller switches the plurality of light sources according to a determined wavelength of the excitation light.

5. The inspection apparatus according to claim 1, further comprising a plurality of second band-pass filters configured to transmit beams of emitted light with different wavelength bands, wherein the controller switches one of the second band-pass filters disposed in an optical path leading from the light-emitting element to the light detector, according to a determined wavelength of the excitation light.

6. The inspection apparatus according to claim 1, further comprising a plurality of first wavelength separation elements configured to define wavelengths different from each other as first separation wavelengths, respectively, and configured to separate the excitation light from the emitted light by using the first separation wavelength as separation reference, wherein the controller switches one of the first wavelength separation elements disposed in an optical path leading from the light source to the light-emitting element and in an optical path leading from the light-emitting element to the light detector, according to a determined wavelength of the excitation light.

7. The inspection apparatus according to claim 1, further comprising a plurality of second wavelength separation elements configured to define wavelengths different from each other as second separation wavelengths, respectively, and configured to separate emitted light with a wavelength longer than the second separation wavelength from emitted light with a wavelength shorter than the second separation wavelength by using the second separation wavelength as separation reference, wherein the light detector comprises: a first photodetector configured to, from among beams of the emitted light, detect emitted light with a wavelength longer than the second separation wavelength; and a second photodetector configured to, from among beams of the emitted light, detect emitted light with a wavelength shorter than the second separation wavelength, and the controller switches one of the second wavelength separation elements disposed in an optical path leading from the light-emitting element to the first photodetector and the second photodetector, according to a determined wavelength of the excitation light.

8. The inspection apparatus according to claim 1, further comprising:

a plurality of second band-pass filters configured to transmit beams of the emitted light with different wavelength bands; a plurality of first wavelength separation elements configured to define wavelengths different from each other as first separation wavelengths, respectively, and configured to separate the excitation light from the emitted light by using the first separation wavelength as separation reference; and a plurality of second wavelength separation elements configured to define wavelengths different from each other as second separation wavelengths, respectively, and configured to separate emitted light with a wavelength longer than the second separation wavelength from emitted light with a wavelength shorter than the second separation wavelength by using the second separation wavelength as separation reference, wherein the light source comprises: a white light source of the excitation light; and a plurality of first band-pass filters configured to transmit beams of the excitation light with different wavelength bands, the light detector comprises: a first photodetector configured to, from among beams of the emitted light, detect emitted light with a wavelength longer than the second separation wavelength; and a second photodetector configured to, from among beams of the emitted light, detect emitted light with a wavelength shorter than the second separation wavelength, and the controller switches one of the first band-pass filters, one of the second band-pass filters, one of the first wavelength separation elements, and one of the second wavelength separation elements in an integral manner, according to a determined wavelength of the excitation light.

9. An inspection method for inspecting an object comprising a substrate bearing a plurality of light-emitting elements, the method comprising the steps of:

inputting information on an emission color of a light-emitting element;

deriving an absorption edge wavelength of the substrate of the object and a peak wavelength of an emission spectrum of the light-emitting elements, based on the information on the emission color; and controlling the light source in such a way as to make a wavelength of excitation light longer than the absorption edge wavelength and shorter than the peak wavelength, the excitation light being emitted from the light source onto the light-emitting element.

* * * * *